United States Patent [19]

Koda et al.

[11] Patent Number: 4,650,286
[45] Date of Patent: Mar. 17, 1987

[54] LIQUID CRYSTAL LIGHT VALUE COLOR PROJECTOR

[75] Inventors: Nobuo J. Koda, Vista; William P. Bleha, Jr., Carlsbad; Harry W. Giehll, San Marcos; Stephen J. Reinsch, Vista; Paul F. Robusto, Oceanside, all of Calif.

[73] Assignee: Hughes Aircraft Company, Los Angeles, Calif.

[21] Appl. No.: 783,328

[22] Filed: Oct. 3, 1985

Related U.S. Application Data

[63] Continuation of Ser. No. 536,423, Sep. 27, 1983, abandoned.

[51] Int. Cl.[4] ............................................. G02F 1/13
[52] U.S. Cl. .................................... 350/331 R; 350/337; 350/342; 350/402; 350/408
[58] Field of Search ............... 350/387, 342, 336, 334, 350/337, 401, 403, 408, 169; 358/61

[56] References Cited

U.S. PATENT DOCUMENTS

| | | | |
|---|---|---|---|
| 3,569,988 | 3/1971 | Schmidt | 350/387 X |
| 3,710,015 | 1/1973 | Fowler | 358/61 |
| 3,748,017 | 7/1973 | Yamamura et al. | 350/336 |
| 4,018,509 | 4/1977 | Boswell et al. | 350/342 |
| 4,127,322 | 11/1978 | Jacobson et al. | 350/342 X |
| 4,191,456 | 3/1980 | Hong et al. | 350/342 X |
| 4,343,535 | 8/1982 | Bleha | 350/342 |
| 4,389,096 | 6/1983 | Hori et al. | 350/342 X |
| 4,408,836 | 10/1983 | Kikuno | 350/334 |
| 4,464,018 | 8/1984 | Gagnon | 350/331 R |

FOREIGN PATENT DOCUMENTS

0675357 7/1952 United Kingdom ................ 350/169

*Primary Examiner*—John K. Corbin
*Assistant Examiner*—David Lewis
*Attorney, Agent, or Firm*—Joseph E. Szabo; Anthony W. Karambelas

[57] ABSTRACT

A compact, full color, light projection system using a liquid crystal light valve (LCLV) and a unique combination of optical devices. The LCLV operates to modulate a light beam which has been polarized by one of the optical devices. The modulated light beam is converged and registered by other optical devices to form the output image.

5 Claims, 2 Drawing Figures

LIQUID CRYSTAL LIGHT VALUE COLOR PROJECTOR

This application is a continuation of application Ser. No. 536,423, filed on Sept. 27, 1983 now abandoned.

BACKGROUND OF THE INVENTION

1. Field of the Invention

This invention relates to liquid crystal light valve (LCLV) projectors, in general, and more particularly, to such projectors which provide color projection.

While the present invention is described with reference to particular applications, it is to be understood that the invention is not limited thereto. Those having ordinary skill in the art and access to the teachings of this invention will recognize additional applications within the scope thereof.

2. Description of the Prior Art

The development of the liquid crystal light valve (LCLV) has opened the door to substantial progress in the state of the art of high quality large screen projectors. In the past, these projectors have been monochromatic or have used separate light valves for separate colors. The LCLV is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube (CRT), is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirror is polarization-modulated in accordance with the information incident on the photoconductor. Therefore, if a complex distribution of light, for example a high resolution input image, is focused onto the photoconductor surface, the device converts that image into a replica which can be projected with magnification to produce a high brightness image on a viewing screen. U.S. Pat. No. 4,019,807 issued to D. D. Boswell et al. on Apr. 26, 1977 discloses such a high performance reflective mode liquid crystal light valve.

A graphics display projector using a liquid crystal light valve of the above-type is described in an article entitled "Application of the Liquid Valve to a Large Screen Graphics Display," published in the 1979 Society for Information Display (SID), International Symposium, Digest of Technical Papers, May 1979, pp. 22-23. This display system, a type with which the present invention is particularly but not exclusively concerned, projects a large scale image having yellow-wite characters on a dark blue background. The system includes a CRT which provides input imagery; projection optics which provides the bright collimated output beam and necessary light polarization; and the LCLV which interfaces the input and output functions.

The system uses a powerful light source such as a Xenon arc lamp to illuminate the LCLV through collimating and polarizing optics. Light emitted from the Xenon arc lamp is transmitted to a polarizing prism where it is separated into "S" and "P" components. The "P" component passes through the prism while the "S" component is reflected toward the LCLV. Information displayed by the cathode ray tube is transferred by fiber optics to one side of the LCLV where it activates the light valve to change the polarization of a portion of the state from "S" to "P". The light is then transmitted through the prism and imaged on a screen by the projection lens. In this capacity, the prism effectively functions as an analyzer, converting modulations of polarization to modulations of brightness or intensity.

The quality of the projected image is a function of its brightness, resolution, and contrast, as described in co-pending U.S. patent application of W. P. Bleha, Ser. No. 103,683, filed Dec. 14, 1979, entitled METHOD AND APPARATUS FOR ENHANCEMENT OF IMAGES DISPLAYED WITH A LIQUID CRYSTAL LIGHT VALVE (now U.S. Pat. No. 4,343,535) and assigned to the common assignee. This application describes techniques for reducing the irregularities and inhomogeneities in the polarizing prism and light valve.

Reference is also made to the co-pending U.S. patent application entitled POLARIZER-ANALYZER FOR LIQUID CRYSTAL LIGHT VALVE PROJECTORS, by R. S. Gagnon, bearing Ser. No. 297,904, filed on Aug. 31, 1981 and assigned to the common assignee. This application describes a unique polarizer element used in a monochromatic projector system using an LCLV.

CROSS REFERENCES

Other publications of interest are listed herewith. The entire contents of these publications are included in this description by incorporation thereof herein by reference thereto.

U.S. Pat. No. 4,127,322; HIGH BRIGHTNESS FULL COLOR IMAGE LIGHT VALVE PROJECTION SYSTEM: A. D. Jacobson, et al. This patent describes an electro-optical system for real time projection of very high brightness, full color pictorial images from television or other program sources onto a large display screen from a set of three reflection-type AC driven field effect mode birefringent liquid crystal light valves each of which modulates a primary color component video image onto a collimated beam of polarized light.

U.S. Pat. No. 4,191,456; OPTICAL BLOCK FOR HIGH BRIGHTNESS FULL COLOR VIDEO PROJECTION SYSTEM: B. S. Hong et al. This patent describes an improved optical block (prism) for use in a high brightness, full color image projection system wherein high intensity (achromatic) projection light is modulated by a full color image composed of a plurality of monochromatic images applied to a plurality of polarization modulating light valves.

*Proceedings of SPIE-The International Society for Optical Engineering*, "Optical-to-optical image conversion with the liquid crystal light valve," W. P. Bleha et al, Integrated Optics and Millimeter and Microwave Integrated Circuits (1981), Vol. 317, pp. 179-184. This paper describes the operation of liquid crystal light valves with emphasis on ways of optically addressing the valve and multi-optical read-out capabilities thereof.

SUMMARY OF THE INVENTION

The present invention is an improved LCLV projection system capable of projecting a plurality of color beams which are then registered by a lenticular lens system.

In particular, a plurality of CRT's are coupled to supply light to a single LCLV via fiber optic elements.

A suitable source supplies projection light to a polarizing prism. The projection light is modulated by the light from the CRT's. The modulated light output from the prism is conveyed and registered by an output optic system to project a full color image.

DETAILED DESCRIPTION OF A PREFERRED EMBODIMENT OF THE INVENTION

Figure 1:
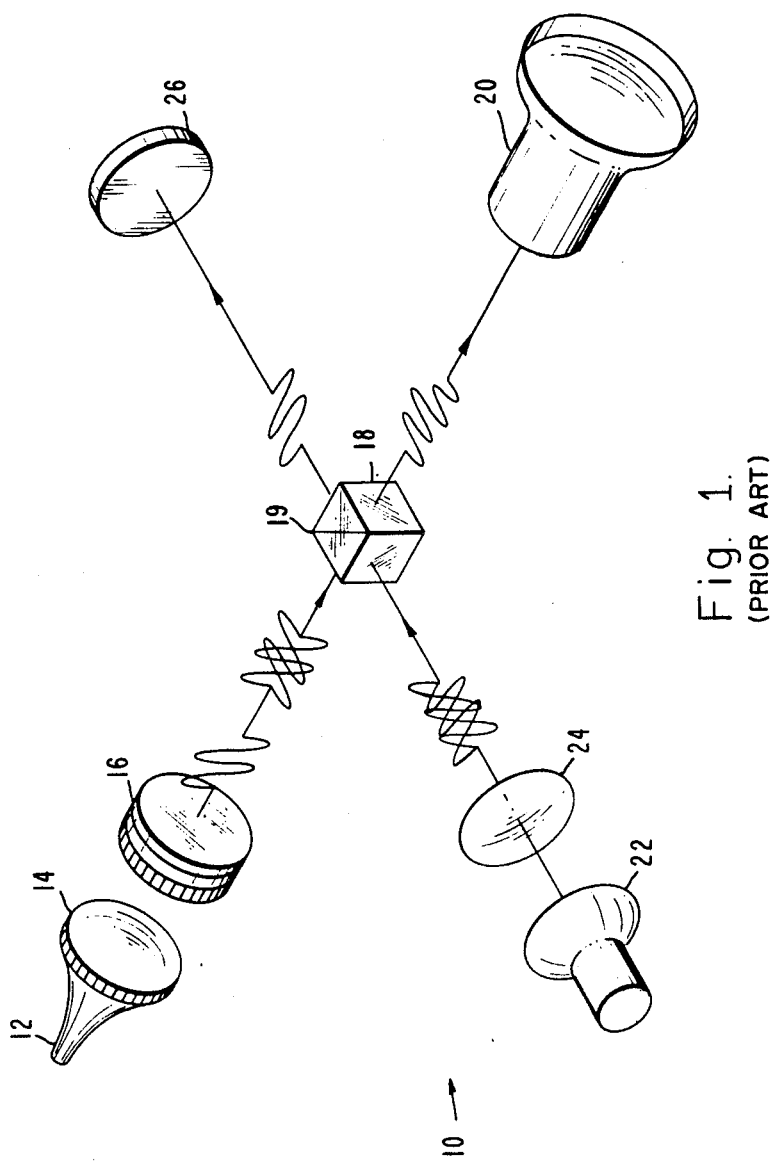
FIG. 1 is a schematic representation of a conventional liquid crystal projector.

Referring now to FIG. 1 there is shown a conventional liquid crystal light valve projection system 10 such as is described in the co-pending application of Bleha and/or U.S. Pat. No. 4,127,322 noted supra which are incorporated herein in their entirety by reference thereto. The system 10 includes a cathode ray tube (CRT) 12 with a fiber optic plate or coupler 14. A light valve 16 such as that described in U.S. Pat. No. 4,019,807 is aligned with the coupler 14. A polarizing beam splitter 18 of the MacNeille bi-prism variety is in optical alignment with the liquid crystal light valve 16. The MacNeille bi-prism is described in U.S. Pat. No. 2,403,731. A projection lens 20 is also disposed in the optical path of the liquid crystal light valve 16 on the opposite side of the bi-prism 18 (hereinafter prism 18). A Xenon arc lamp 22 is mounted so that it emits light in a plane normal to the path from the light valve 16 to the projection lens 20. A collimating lens 24 is positioned between the Xenon arc lamp 22 and the prism 18. Finally, an optical dump 26 is positioned in the optical path from the Xenon arc lamp 22 on the opposite side of the prism 18 if so desired. The optical dump 26 is typically made of any suitable light absorbent material.

In operation, the Xenon arc lamp 22 emits light of high intensity which is collimated by lens 24. All light emitted by the Xenon arc lamp is randomly polarized and includes "S" and "P" components. For illustrative purposes, the "S" polarized light is shown as vertical waves and the "P" polarized light is shown as horizontal waves. The direction of propagation is indicated by the arrows.

The collimated light with "S" and "P" polarized components enters the prism 18 and is incident upon surface 19. The "P" polarized component passes through the surface 19 to the absorbing layer 26 where it is removed from the system. The vertically or "S" polarized component is reflected by the surface 19 to the liquid crystal light valve 16.

The LCLV modulates the polarization of the incoming light in accordance with the light output of the control device, for example CRT 12. Where the CRT is bright, the light valve changes the polarization of the incident light partially from "S" to "P" prior to reflecting it back to the surface 19. Where the CRT is dark, the light valve has no effect on the polarization of the incident light and merely reflects it back to the surface 19 unchanged. In effect, all light incident on the light valve 16 from the prism 18 is reflected back to the prism. On returning to the prism, the "P" polarized light passes through to a projection lens 20 and is ultimately projected on a displaying surface (not shown). On the other hand, the "S" polarized light is reflected in the direction of the Xenon arc lamp 22 and has no effect on the displayed image.

Figure 2:
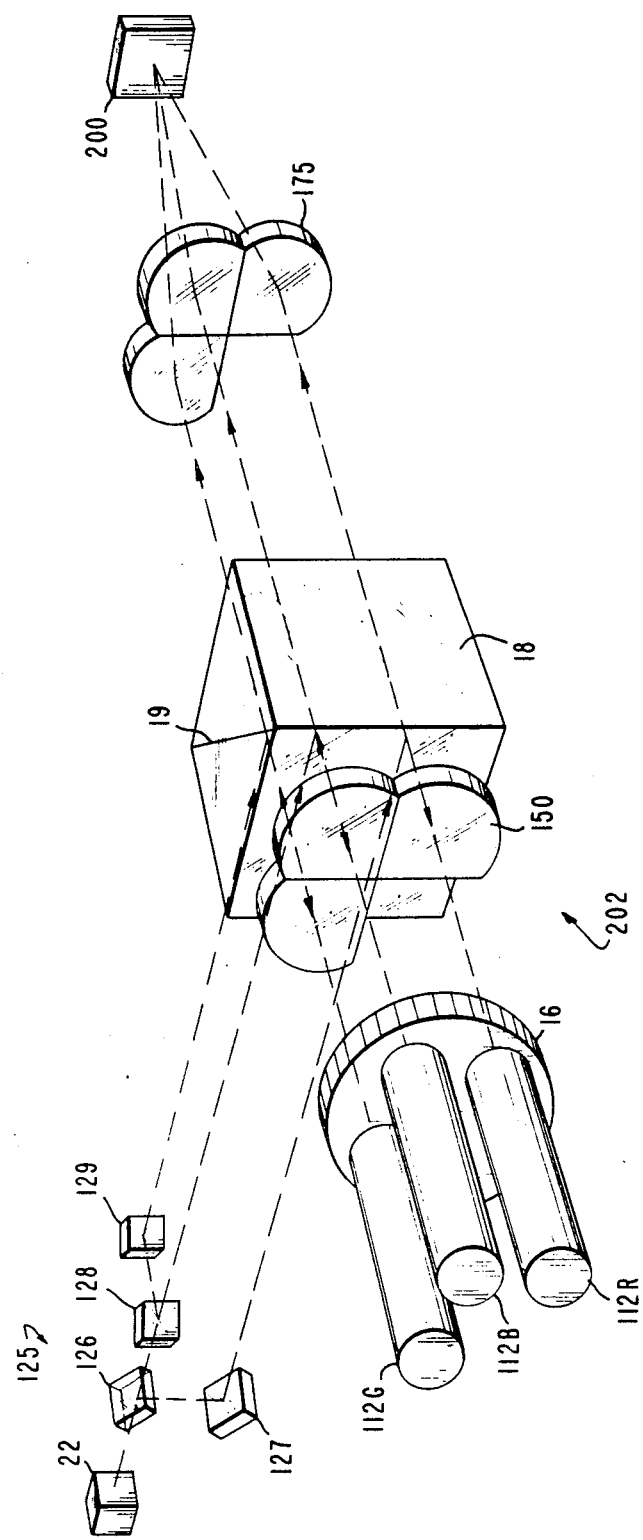
FIG. 2 is a schematic representation of a liquid crystal projector according to the instant invention and capable of producing multiple color outputs.

Referring now to FIG. 2, there is shown a schematic representation of the improved liquid crystal light valve color projector system 202 of the instant invention. The system 202 of this invention includes components which are similar to those shown in FIG. 1. Those components bear similar reference numbers. Thus, a projection source 22 provides a collimated beam of white light which is ultimately supplied to a MacNeille bi-prism 18 similar to prism 18 in FIG. 1. Typically, optical devices may be used to collimate the light from a projection lamp into a 1" diameter beam. In one embodiment, the lamp is 500 W and produces 300 lumens. This source (rather than the CRT) controls the projection brightness of the system. In addition, a liquid crystal light valve 16 is used to supply the modulating light valve apparatus.

In a preferred embodiment, LCLV is a single 2" diameter valve such as a Hughes Model H4060. The operation of a suitable LCLV is described in, inter alia, an article titled "Application of the Liquid Crystal Light Valve to Real-Time Optical Data Processing," by W. P. Bleha et al, in *Optical Engineering*, July/August 1978, Vol. 17, No. 4, pp. 371-384. Typically, the LCLV projection displays are capable of 1,000 television line resolution in any primary color using the complete 2" diameter of the valve.

In particular, a plurality of relatively small, e.g. 1" diameter, cathode ray tubes 112B, 112R and 112G are coupled through any suitable fiber optic coupling mechanism to the surface of LCLV 16. The CRT's selectively activate the LCLV photosensor layer. In one embodiment, the CRT projection displays have 800 raster line resolution and use Hughes Model H1380 CRT's. The fiber-optic coupling mechanism can include a wedge-shaped portion to permit the CRT's to be easily positioned if so desired.

A three section lenticular convergence (or preconvergence) lens 150 is disposed between the other surface of LCLV 16 and one surface of polarizing prism 18. Lens 150 is typically achromatic with a relatively long, e.g. 200 mm., focal length. Lens 150 makes the primary color light beams smaller at the projection lens thereby minimizing lens aberration effects.

A color filter system 125 comprising a plurality of dichroic filters is disposed between the projection light source 22 and another surface of prism 18 such that the light from the color system is incident on prism 18 in a direction which is normal to the light which is incident from LCLV 16. In particular, the color filter system 125 includes filters 126, 127, 128 and 129, which are set to polarize the incident light in the desired direction. In one system, the light transmission by the filter system was better than 80%. These lenses are arranged so that when white light is incident upon filter 126, for example, the red wavelength light is reflected onto mirror 127 which reflects the red light to prism 18.

The light which passes through filter 126 impinges upon filter 128 which permits the blue wavelength light to pass therethrough and impinge upon prism 18. In addition, filter 128 reflects the green portion of the light beam onto mirror 129 which reflects this green light to be incident upon prism 18. By using this filter system, the primary (or other) light segments are separated out of the beam and applied at different locations of the prism 18. These locations are related to appropriate wavelength beams for the CRT's.

A further three segment lenticular projection lens 175 is disposed adjacent the output side of prism 18. That is, the lenticular projection lens is at the opposite surface of prism 18 from the LCLV 16. Lens 175 is also achromatic with the components thereof offset in a manner similar to lens 150 in order to register (converge) the three primary color images at the projection screen 200. The focal length and F number will vary depending upon the image distance and size. In one embodiment, a focal length of 75 mm and an F/no.=2 were used to form a screen size of 4'×5'.

In essence then, the white projection light from a suitable source, such as the Xenon arc lamp 22 described relative to FIG. 1, is supplied to the color filter system 125. The three primary colors are separated out of the white light by the color filter system 125 and applied to prism 18. The respective light beams are reflected by the surface 19 (as was the case in prism 18 in FIG. 1) onto the LCLV 16. The same net polarizing effect takes place because of prism 18. As noted, the lenticular preconvergence lens 150 has the effect of causing the beams (red, blue and green) to be partially converged and reduces the beam size at the projection lens 175. Moreover, the individual lens components are offset from the LCLV miniraster center so that the primary color light beams are well separated at the projection lens system.

These respective light beams are applied to the LCLV 16 where they are, individually, modulated by the signal or image which is generated by the respective CRT's 112R, 112B and/or 112G. The modulation effect on the respective polarized light beams is the same as in the case of FIG. 1. The light beams are then reflected from LCLV 16, after modulation, and selectively pass through the prism 18. That is, the modulated light beam is applied to lenticular projection lens 175 which has the net effect of causing the light signals (beams) to be converged at the appropriate projection screen 200 wherein the signals are properly registered and contained. The degree of convergence can be controlled by the lateral position of the respective lenticular lens positions. With the system described above a contrast ratio of highlights was, typically, 20:1.

Registration of the three color signals is a critical function for any projection system utilizing three separate active areas. An advantage of registering patterns in this system is that the active raster sizes are small and close together. With the combined optics and deflection linearity control, registration within 50% of the line width at the extreme raster edge has been achieved. Additional improvement in linearity is expected to be provided by more sophisticated linearity correction circuits, such as microprocessor-controlled dynamic linearity correction circuits.

Another variation of the single-light-valve color projector is the use of one 2" diameter, fiber optics faceplate, CRT which is fiber optically coupled to the light valve input. In this embodiment, the three mini-rasters are displayed in sections of the CRT faceplate area. The advantage is that a single CRT is used. The disadvantage is that a scan converter is also necessary in order to convert and display the three color-signals into the display format of the three mini-rasters. This means storing a frame of color signals, with the three color-signals supplied in parallel and the output format of the three color mini-displays readout onto the CRT in one large TV raster. This scan converter memory requirement is large and for this reason the three mini-CRT approach previously described is considered simpler.

Thus, there is shown and described a new and unique liquid crystal light valve color projector with a single LCLV and a plurality of CRT's (or CRT sections) coupled thereto. This system permits the resolution and brightness advantages of an LCLV system to be preserved. The multiple color mini-displays are registered by a unique lenticular lens projection system to provide a high resolution signal image which is capable of panchromatic operation.

Some particular advantages of the instant invention are the reduction in cost and size relative to prior art color projection systems. This is primarily due to the use of a single LCLV. In addition, this system permits a brightness advantage for a given resolution as a result of the use of a single LCLV.

While a preferred embodiment of the invention is described, it is clear that those skilled in the art may conceive of modifications to the described system. For example, more (or fewer) CRT's may be used in conjunction with the lenticular lens systems, and so forth. Also, to eliminate color mixing from closely spaced rasters, color filters can be used at the projection lens, if desired. However, any such modifications which fall within the purview of this description are intended to be included therein as well. That is, this description is intended to be illustrative only and is not intended to be limitative. The scope of the invention is limited only by the claims appended hereto.

We claim:

1. An electro-optical system for projecting full color images in real time comprising:
   (a) means, including at least one liquid crystal light valve, for modulating incident light;
   (b) means for producing a plurality of separate video images, each video image representing a different color component of a multi-colored image, and each image being individually coupled optically to a different distinct area of said incident light modulating means;
   (c) a polarizing bi-prism for splitting an incident light beam into a pair of differently polarized light beam components;
   (d) a white projection light source;
   (e) color filter means interposed between said projection light source and said bi-prism to convert said projection light into a plurality of light beams of different colors, each color light beam being split by said bi-prism into a pair of differently polarized light beam components, and one component of each such beam being reflected by said bi-prism and impinging upon a different distinct area of said incident light modulating means so that said one component of each color light beam is individually modulated by the distinct area of said incident light modulating means upon which it impinges;
   (f) a screen for producing a full color, real time image as determined by said video image generators coupled to said incident light modulating means;
   (g) a multi-segment projection lens between said bi-prism and said screen and having individual segments positioned to receive the light beam component modulated by a respective distinct area of said incident light modulating means and laterally positioned to individually control the lateral position of that light beam component on said screen so as to bring into registry on said screen all of said modulated light beam components; and (h) a multi-segment preconvergence lens between said incident light modulating means and said bi-prism and having an individual segment for each distinct area of said incident light modulating means.

2. An electro-optical system in accordance with claim 1 characterized further in that the polarized components of said primary color light beams impinge on a side of said incident light modulating means which is opposite that to which said video images are optically coupled.

3. An electro-optical system in accordance with claim 1 characterized further in that:

(a) said means for producing a plurality of separate video images comprises three cathode ray tubes;

(b) said incident light modulating means comprises a single liquid crystal light valve; and (c) the polarized components of said primary color light beams impinge on a side of said liquid crystal light valve which is opposite that to which said video images are optically coupled.

4. The electro-optical system of claim 1 additionally including a multi-segment preconvergence lens between said LCLV and said polarizing means and having an individual segment for each distinct area of said LCLV.

5. The electro-optical system of claim 1 characterized further in that said incident light modulating means comprises a single, reflective liquid crystal light valve and in that said three separate video images are all of the same color.

* * * * *